April 7, 1942.   L. W. BUCHANAN   2,279,223
PLUG-REVERSING, CAPACITOR-START, INDUCTION-RUN MOTOR
Filed Jan. 5, 1940
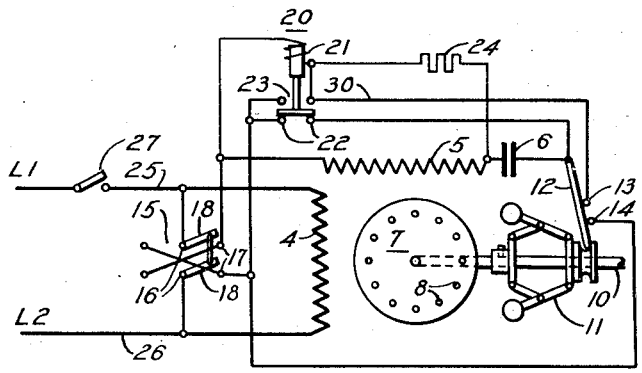
WITNESSES:
INVENTOR
Lloyd W. Buchanan.
BY
ATTORNEY Patented Apr. 7, 1942

2,279,223

UNITED STATES PATENT OFFICE 2,279,223

PLUG-REVERSING CAPACITOR-START INDUCTION-RUN MOTOR

Lloyd W. Buchanan, Lima, Ohio, assignor to Westinghouse Electric & Manufacturing Company, East Pittsburgh, Pa., a corporation of Pennsylvania Application January 5, 1940, Serial No. 312,525

8 Claims. (Cl. 172—279)

My invention relates to single-phase self-starting induction-motors for use on applications such as cranes, hoists, door-openers, lathes, and on numerous other applications requiring plug-reversing motors, or motors which may be very quickly reversed by reversing the starting-winding connections relative to the main-winding connections. My invention particularly relates to capacitor-type motors which are provided with a start-run switch for disconnecting the capacitor-type starting-winding when the motor reaches a predetermined percentage of its normal running-speed.

The principal object of my invention is to provide novel and improved means for effecting the plugging reversal of capacitor-motors of the above-described type.

More specifically, my invention relates to a plug-reversing control-means utilizing a line-voltage-responsive auxiliary relay which can be simply designed in accordance with the line-voltage, without requiring a separate, specially designed relay for each current-rating of a series of motors of a similar type.

With the foregoing and other objects in view, my invention consists in the systems, methods, combinations, circuits and apparatus hereinafter described and claimed and illustrated in the accompanying drawing wherein the single figure is a diagrammatic view of circuits and apparatus embodying my invention in a preferred form of embodiment.

As shown in the drawing, my invention is utilized in connection with a self-starting single-phase capacitor-type induction-motor having a primary member which is wound with a main-winding 4 and a substantially quadrature-related starting-winding 5. The starting-winding 5 is connected in series-circuit relation to a capacitor 6 which causes the current in the starting winding-means 5—6 to be out of phase with the current in the main-winding 4 when both windings are energized in parallel across the same single-phase line L1—L2. The motor is also provided with a secondary member which is shown as the rotor-member 7, provided with squirrel-cage windings 8, or other equivalent poly-axially short-circuited secondary winding-means. The rotor member 7 is mounted on a shaft 10 which is illustrated as carrying a speed-responsive device or centrifugal governor 11 which actuates a start-run switch 12 having two back-contacts 13 and 14.

To reverse the motor, a double-pole double-throw reversing-switch 15 is provided, having input-terminals 16 and output-terminals 17, which may be connected together, in either order of connection or which may be disconnected from each other, by means of double-throw switch-blades 18.

In accordance with my invention, I also provide a line-voltage-responsive relay 20 having an actuating coil 21, back-contacts 22, and front or make-contacts 23. I also provide an auxiliary resistor 24 or other auxiliary impedance-device.

The motor-terminals 25 and 26 are connected to the supply-line L1—L2 through a line-switch 27. The motor-terminals 25 and 26 are connected to the terminals of the main-winding 4 and also to the input-terminals 16 of the reversing-switch 15. The output-terminals 17 of the reversing switch are utilized to energize the starting-winding 5 through the capacitor 6, the centrifugal switch 12 and the back-contact 14 of the centrifugal switching device, when the latter is in its starting position, as illustrated. The operating coil 21 of the relay 20 is initially energized, with the line-voltage, from the output-terminals 17 of the reversing-switch 15, through a circuit which includes a conductor 30, and the back-contacts 13 and 14 which are shunted by the centrifugal switch-arm 12 in the starting position of the latter. When the relay 20 once picks up, a holding-circuit is established through the make-contacts 23 of the relay, which connects the operating coil 21 across the output-terminals 17 of the reversing-switch 15, so that the relay remains energized as long as it receives at least a certain critical voltage, which may be of the order of 50% of the supply-voltage of the line L1—L2. A second energizing circuit for the starting winding-means 5—6 is provided by the relay back-contacts 22 which by-pass the centrifugal switch-circuit 12—14, so that the relay 20 will cause the starting-winding-means 5—6 to be energized, across the output-terminals 17 of the reversing-switch 15, and hence across the motor-terminals 25 and 26, whenever the relay 20 is in its deenergized or non-actuated position, regardless of the position of the centrifugally-actuated start-run switch 12.

The motor-controller means thus far specifically described, except for the auxiliary resistor 24, constitute the subject matter of a copending application of W. C. Spear, Serial No. 313,244, filed January 10, 1940, and assigned to the Westinghouse Electric & Manufacturing Company, relating to Self-starting single-phase induction-motors with plugging reversing connections.

In accordance with my present invention, the relay-operating winding 21 is also connected in series with the auxiliary resistor 24, and preferably across the terminals of the capacitor-winding 6, or, in general, across one of the two parts 5 and 6 of the capacitor winding-means or circuit 5—6. The purpose of this connection is to cause the relay-coil 21 to receive sufficient energization from the capacitor-winding 5, even with the resistor 24 connected in series with the relay-coil 21, to pick up this relay when the line-voltage is restored after a momentary flicker or failure of the line-voltage, while the motor is operating, the line-voltage being quickly restored before the motor has had time to slow down sufficiently to move the start-run switch from its running position to its starting position. This re-picking-up operation of the relay 20 is made possible by reason of the generated voltage which is induced in the auxiliary or starting winding 5 when the motor is in operation, or more definitely by the partial condition of resonance which is created by the reapplication of the line-voltage to the starting-winding 5 in series with the capacitor 6, while the motor is running, so that the voltage across the starting-winding 5, during the running-conditions of the motor, is higher than the line-voltage, because of such partial resonance.

In operation, the reversing-switch 15 is initially closed, in one position or the other, in preparation for energizing the motor in a desired direction of rotation. The motor is energized by the closure of the line-switch 27 which causes the main-winding 4 and the starting winding-means 5—6 to be energized, in parallel with each other, across the line L1—L2, in the manner previously described. The motor then rapidly starts, and at a certain predetermined speed, in its starting cycle, the centrifugally-actuated start-run switch 12 suddenly snaps open, breaking the back-contacts 13 and 14. The opening of the back-contact 14 disconnects the starting winding-means 5—6 from the line, so that the motor thereafter operates only on its main or running winding 4. The opening of the back-contact 13 breaks the initial energizing-circuit through the relay-coil 21, but the relay has meanwhile picked up and established its own holding-circuit at its front-contacts 23, so that the relay 20 remains in its actuated position during the entire normal running-operation of the motor.

When it is desired to reverse the motor, all that is required is to reverse the double-throw reversing-switch 15. The initial movement of the reversing-switch blades 18 deenergizes the output-terminals 17 of the reversing-switch, thus deenergizing the relay 20, so that the latter drops out, and returns to its deenergized position, closing its back-contacts 22. When the reversing-switch blades 18 are moved all the way over to the closed position in the reversed order of energization of the output terminals 17 of the reversing-switch 15, a circuit will be immediately established, through the relay back-contacts 22, to the starting winding-means 5—6, even though the centrifugal switch 12 is in its running-position with the switch-blade 12 out of contact with its back-contact 14. This energization of the starting-winding-means 5—6 causes said winding-means to be energized from the line L1—L2 in a polarity which is reversed with respect to its initial starting-polarity, so that the motor is now energized in such manner as to develop a strong torque tending to cause the motor to operate in a reversed direction.

The condition of partial resonance between the starting-winding 5 and the capacitor 6 is disturbed by the strong starting-current in-rush, or reversing-current in-rush, during these conditions, so that insufficient voltage appears across the starting-winding 5 to cause an actuation of the relay 20. The motor is now rapidly decelerating, under the influence of the reversing torque, and when its speed falls off a sufficient amount, the centrifugal start-run switch 12 will return to its starting position, establishing a second energizing circuit, at the back-contact 14, for the starting winding-means 5—6. At the same time, the start-run switch 12 closes its back-contact 13, which energizes the relay-coil 21 across the line, and produces an actuation or picking-up of the relay. It will be noted, however, that the relay 20 has remained in its non-actuated position long enough to cause the motor to decelerate to the speed at which the centrifugal switch 12 returns to its starting position, at which time the centrifugal-switch contact 14 continues to energize the starting winding-means 5—6, even after the relay 20 has opened its back-contacts 22. The motor thereupon continues to decelerate to standstill, and immediately begins to accelerate again in the reverse direction, with both of the primary windings 4 and 5 energized, until, at a predetermined critical speed in the reverse direction, the centrifugal switch 11—12 again operates and deenergizes the starting-winding 5, leaving the auxiliary relay 20 energized through its holding-contact 23, as previously described.

It will be noted that my provision of the relay-exciting-connection including the auxiliary resistor 24 is useful in providing an auxiliary source of energization for the relay-coil 21, so as to prevent the relay 20 from remaining deenergized after a momentary power-interruption, as long as the motor-rotor 7 has any considerable speed. This is particularly true if the power-supply-interruption to the relay-coil 21 is caused by an opening of the reversing-switch 15, so that the main motor-winding 4 remains energized, in which case the motor-speed can drop to a considerably lower value than if both primary windings 4 and 5 are deenergized, while the motor is running, before the voltage which is generated in the auxiliary winding 5 falls to a value low enough to permit the relay 20 to drop out. In practice, it is practicable to design the relay 20 so that it will drop out when the starting-winding circuit is deenergized while the motor is running, but the auxiliary relay-energizing circuit 24 will cause the relay to pick up again if line-voltage is again applied to the partially resonant starting-winding circuit 5—6 while the motor still has any considerable speed.

In this manner, I make it possible for the motor to withstand a momentary interruption in power, or a momentary opening of the contacts of the reversing-switch 18, quickly thereafter restoring the contacts to their original position, without causing the relay 20 to permanently remain out. This provision of the auxiliary relay-energizing circuit 24 is desirable, because otherwise, if the relay 20 should drop out and lock itself out while the start-run switch 12 is in its running position, the relay 20 would continuously energize the starting winding 5. Ordinarily, this starting winding 5 is not designed to be continuously energized, so that it would be very undesirable for this continuous energization to occur.

The fact that I utilize a capacitor 6 in series with the starting winding 5 is very helpful in making possible the correct operation of the relay-holding circuit including the auxiliary resistor 24, because, when the motor is running at full speed, the capacitor 6 causes the voltage appearing across the terminals of the auxiliary winding 5 to be something like 160% of the line-voltage, so that, ordinarily, a low-current, high-resistance impedance-device 24 may be connected in series with the relay-coil 21, and still permit the relay-coil to receive the voltage necessary to cause the relay to pick up and move to its actuated position. Even though the motor is not running at quite its full speed at the moment when the line-voltage is restored, after a brief power-interruption, the auxiliary-winding voltage may obviously be considerably less than 160% of the line-voltage, and still afford adequate voltage to pick up the relay 20, even with impedance 24 in series with its coil 21, in the event of a brief opening of either the main line-switch 27 or of the reversing-switch 18.

When the reversing-switch 18 is reversed, however, and the line-voltage is applied to the motor with the reversed connection of the starting-winding, the heavy current-inrush destroys the condition of partial resonance between the inductive reactance of the starting-winding 5 and the capacitive reactance of the capacitor 6, so that the starting-winding voltage, under these particular conditions, is not sufficient to pick up the relay 20.

When the starting-switch 11 is in its starting position, the resistor 24 is connected in parallel to the starting-capacitor 6, through the switch-contacts 12—13, but because of its high resistance, the resistor 24 does not interfere with the relatively low-impedance capacitor 6 during the starting-operating.

While I have illustrated my invention in but a single form of embodiment, which is at present preferred by me. I desire such illustration to be taken merely as an illustration, and not as excluding such additions, omissions and substitutions as would ordinarily occur to the skilled workers of the art. I desire, therefore, that the appended claims shall be accorded the broadest construction consistent with their language and the prior art.

I claim as my invention:

1. In combination, a self-starting single-phase induction-motor having relatively rotating primary and secondary members, the primary member having a main-winding and a substantially quadrature-related starting-winding, a capacitor connected in series-circuit relation to the starting-winding for producing current out of phase with the current in the main-winding, means for establishing starting connections whereby both the main-winding and the starting-winding are energized in parallel from a single single-phase supply-line, start-run switching-means, operable after the motor has started, for changing the connections of the starting-winding and for also changing an auxiliary relaying circuit, reversing-means for reversing the connections of one of said primary-member windings relatively to the other primary-member winding, a line-voltage-responsive relay operable, in its non-actuated position, to substantially establish the starting connections of the starting-winding even when the start-run switching-means is in its running condition, means for initially energizing said relay through the auxiliary relaying circuit of said start-run switching-means when the latter is in its starting condition, separate circuit-means for subsequently maintaining the energization of said relay from the line-voltage as long as at least a predetermined voltage is applied thereto, an additional impedance-means, circuit-means for permanently connecting said relay in series with said impedance-means and across the terminals of one of the two parts of the circuit comprising the starting-winding and the capacitor, and means for causing said relay to return to its non-actuated position when said reversing-means is operated.

2. In combination, a self-starting single-phase induction-motor having relatively rotating primary and secondary members, the primary member having a main-winding and a substantially quadrature-related starting-winding, a capacitor connected in series-circuit relation to the starting-winding for producing current out of phase with the current in the main-winding, means for establishing starting connections whereby both the main-winding and the starting-winding are energized in parallel from a single single-phase supply-line, start-run switching-means, operable after the motor has started, for changing connections of the starting-winding and for also changing an auxiliary relaying circuit, reversing-means for reversing the connections of one of said primary-member windings relatively to the other primary-member winding, a line-voltage-responsive relay operable, in its non-actuated position, to substantially establish the starting connections of the starting-winding even when the start-run switching-means is in its running condition, means for initially energizing said relay through the auxiliary relaying circuit of said start-run switching-means when the latter is in its starting condition, separate circuit-means for subsequently maintaining the energization of said relay from the line-voltage as long as at least a predetermined voltage is applied thereto, an additional impedance-means, circuit-means for permanently connecting said relay in series with said impedance-means and across the terminals of the starting-winding, and means for causing said relay to return to its non-actuated position when said reversing-means is operated.

3. In combination, a self-starting single-phase induction-motor having relatively rotating primary and secondary members, the primary member having a main-winding and a substantially quadrature-related starting-winding, a capacitor connected in series-circuit relation to the starting-winding for producing current out of phase with the current in the main-winding, means for establishing starting connections whereby both the main-winding and the starting-winding are energized in parallel from a single single-phase supply-line, start-run switching-means, operable after the motor has started, for changing the connections of the starting-winding and for also changing an auxiliary relaying circuit, a three-position reversing-switch having input-terminals, output-terminals and operating means having a first position in which the output-terminals are connected to the input-terminals in a first order of connection, a second position in which the electrical connection between the input and output terminals is broken, and a third position in which the output-terminals are connected to the input-terminals in a reversed order of connection, the input-terminals of the reversing-switch being energized from the single-phase supply-line, the starting-winding being energized from the output-terminals of the reversing-switch, a line-voltage-responsive relay operable, in its non-actuated position, to substantially establish the starting connections of the starting-winding even when the start-run switching-means is in its running condition, means for initially energizing said relay from the output-terminals of the reversing-switch through the auxiliary relaying circuit of said start-run switching-means when the latter is in its starting condition, separate circuit-means for subsequently maintaining the energization of said relay from the output-terminals of the reversing-switch as long as at least a predetermined voltage is applied thereto, an additional impedance-means, and circuit-means for permanently connecting said relay in series with said impedance-means and across the terminals of one of the two parts of the circuit comprising the starting-winding and the capacitor, said relay returning to its non-actuated position whenever said reversing-switch is actuated from its first position to its third position, or vice versa.

4. In combination, a self-starting single-phase induction-motor having relatively rotating primary and secondary members, the primary member having a main-winding and a substantially quadrature-related starting-winding, a capacitor connected in series-circuit relation to the starting-winding for producing current out of phase with the current in the main-winding, means for establishing starting connections whereby both the main winding and the starting-winding are energized in parallel from a single single-phase supply-line, start-run switching-means, operable after the motor has started, for changing the connections of the starting-winding and for also changing an auxiliary relaying circuit, a three-position reversing-switch having input-terminals, output-terminals and operating means having a first position in which the output-terminals are connected to the input-terminals in a first order of connection, a second position in which the electrical connection between the input and output terminals is broken, and a third position in which the output-terminals are connected to the input-terminals in a reversed order of connection, the input-terminals of the reversing-switch being energized from the single-phase supply-line, the starting-winding being energized from the output-terminals of the reversing-switch, a line-voltage-responsive relay operable, in its non-actuated position, to substantially establish the starting connections of the starting-winding even when the start-run switching-means is in its running condition, means for initially energizing said relay from the output-terminals of the reversing switch through the auxiliary relaying circuit of said start-run switching-means when the latter is in its starting condition, separate circuit-means for subsequently maintaining the energization of said relay from the output-terminals of the reversing-switch as long as at least a predetermined voltage is applied thereto, an additional impedance-means, and circuit-means for permanently connecting said relay in series with said impedance-means across the terminals of the starting-winding, said relay returning to its non-actuated position whenever said reversing-switch is actuated from its first position to its third position, or vice versa.

5. The invention as defined in claim 1, characterized by said start-run means having an actuating means which is automatically responsive to a predetermined function of the speed of the motor.

6. The invention as defined in claim 2, characterized by said start-run means having an actuating means which is automatically responsive to a predetermined function of the speed of the motor.

7. The invention as defined in claim 3, characterized by said start-run means having an actuating means which is automatically responsive to a predetermined function of the speed of the motor.

8. The invention as defined in claim 4, characterized by said start-run means having an actuating means which is automatically responsive to a predetermined function of the speed of the motor.

LLOYD W. BUCHANAN.